United States Patent [19]

Lo et al.

[11] Patent Number: 5,732,139
[45] Date of Patent: Mar. 24, 1998

[54] QUANTUM CRYPTOGRAPHIC SYSTEM WITH REDUCED DATA LOSS

[76] Inventors: Hoi-Kwong Lo, 1309, Low Block, Lei Moon House Ap Lei Chau Estate; Hoi Fung Chau, Flat C, 42nd Floor, Tower 1, University Heights 23 Pokfield Road, Pokfulam, both of Hong Kong, Hong Kong

[21] Appl. No.: 701,785

[22] Filed: Aug. 26, 1996

[51] Int. Cl.⁶ .................................................. H04K 1/00
[52] U.S. Cl. .................................................. 380/28
[58] Field of Search .......................... 380/28, 46, 49, 380/9

[56] References Cited

U.S. PATENT DOCUMENTS

| | | | |
|---|---|---|---|
| 5,243,649 | 9/1993 | Franson | 380/9 |
| 5,307,410 | 4/1994 | Bennett | 380/21 |
| 5,339,182 | 8/1994 | Kimble et al. | |

FOREIGN PATENT DOCUMENTS

WO 94/08409  4/1994  WIPO.

OTHER PUBLICATIONS

"Quantum Cryptography Based on Bell's Theorem" by Ekert, Phys. Rev., Lett, 67 (1991) 661.
"Quantum Cryptography" by Bennett, Brassard & Ekert, Scientific American, Oct. 1992, p. 50.
"Experimental Quantum Cryptography" by C.H.Bennett, et al Journal of Cryptology (1992).
"Quantum Cryptographic Network based on Quantum Memories" Los Alamos preprint archive quant-ph/9604021.
"Bell's Inequality and Rejected-Data Protocols for Quantum Cryptology" Journal of Modern Optics 40 (1993)1443 by Barnett and Phoenix.
"Efficient Quantum Cryptography," by M. Ardehali Microelectronics Research Laboratories, NEC Corporation, Sagamihara, Kanagawa, 229 Japan, 25 Apr., 1992.
"Referee Report on Efficient Quantum Cryptography" by M. Ardehali.
"Quantum Cryptography, Public Key Distribution and Coin Tossing" by Bennett and Brassard, International Conference on Computers, Systems & Signal Processing, Bangalore, India, Dec. 10-12, 1984.

*Primary Examiner*—David C. Cain
*Attorney, Agent, or Firm*—Woodbridge & Associates

[57] ABSTRACT

A secure method for distributing a random cryptographic key with reduced data loss. Traditional quantum key distribution systems employ similar probabilities for the different communication modes and thus reject at least half of the transmitted data. The invention substantially reduces the amount of discarded data (those that are encoded and decoded in different communication modes e.g. using different operators) in quantum key distribution without compromising security by using significantly different probabilities for the different communication modes. Data is separated into various sets according to the actual operators used in the encoding and decoding process and the error rate for each set is determined individually. The invention increases the key distribution rate of the BB84 key distribution scheme proposed by Bennett and Brassard in 1984. Using the invention, the key distribution rate increases with the number of quantum signals transmitted and can be doubled asymptotically.

25 Claims, 7 Drawing Sheets

ALICE

BOB

PROBABILITY

QUANTUM CRYPTOGRAPHIC SYSTEM WITH REDUCED DATA LOSS

STATEMENT OF GOVERNMENTAL INTEREST

This invention was made with Government support under Contract No. DE-FG02-90ER40542 awarded by the Department of Energy. The government has certain rights in the invention.

BACKGROUND OF THE INVENTION a. Field of the Invention

This invention relates to a secure method for distributing a random cryptographic key using quantum mechanics for reducing data loss.

b. Description of the Prior Art

Cryptography is the art of providing secure communication over insecure communication channels. In the second world war, Allied successes in breaking the ciphers of Germany and Japan played an important part in the outcome of the conflict. With the growth of computer networks for business transactions, there is an ever increasing need for encryption to ensure that this information cannot be obtained by an unauthorized third party.

The security of a conventional crypro-system often relies on some previously shared random secret information (the "key"). For this reason, secure key distribution is a fundamental issue in cryptography. Unfortunately, classical cryptography provides no tools to guarantee the security of key distribution because, in principle, classical signals can be monitored passively, without the sender and receiver knowing that eavesdropping has taken place.

In quantum mechanics, however, a measurement is an active process that leads to the collapse of a wave fi.tnction. Measurements will, therefore, generally lead to disturbance. Consequently, eavesdropping on a quantum channel can be easily discovered by the legitimate users. The experimental feasibility of quantum key distribution has recently been demonstrated by sending dim light pulses through commercial optical fiber over a distance of 23 km (Nature 378, (1995) 449).

In a well-known scheme for quantum key distribution proposed by Bennett and Brassard in 1984 ("BB84") ("Quantum Key Distribution and Coin Tossing," by C. H. Bennett and G. Brassard, in *Proceedings of IEEE International Conference on Computers, Systems and Signal Proceedings*, Bangalore, India (IEEE, 1984), p. 175, and later modified and implemented in "Experimental Quantum Cryptography," by C. H. Bennett et al., *Journal of Cryptology* 5, (1992) 3 and U.S. Pat. No. 5,307,410), the sender and the receiver each randomly and independently select one of the two non-commuting operators (communication modes) for each signal transmitted. They consequently communicate to determine which of the transmitted signals were encoded and decoded using the common operators (i.e., the same communication mode). The data that are encoded and decoded using different operators (i.e., different communication modes) are immediately discarded. Since the two non-commuting operators are chosen independently by Alice and Bob with equal probability, on average, half of the data have to be discarded. Any improvement on the efficiency of quantum key distribution scheme by reducing the fraction of discarded data is, therefore, of great practical importance.

PCT Patent Application WO 94/08409 and also "Bell's Inequality and Rejected-data Protocols for Quantum Cryptography," Journal of Modem Optics 40, (1993) 1443 by Barnett and Phoenix describe how those discarded data may be useful for detecting eavesdropping. However, those disclosures do not suggest or show the possibility of improving the efficiency of BB84 by reducing the fraction of discarded data. Nor do they suggest assigning significantly different probabilities to different non-commuting operators used in transmission and reception. Note also that the preferred embodiment of the invention does not involve the analysis of the rejected data, which is the main thrust of these two disclosures.

An article entitled "Quantum Cryptography," by Bennett, Brassard and Ekert, Scientific American (Oct. 1992), p. 50, reviews ideas in this field. Related Patents are U.S. Pat. No. 5,243,649 and U.S. Pat. No. 5,339,182. In particular, U.S. Pat. No. 5,243,649 describes an embodiment based on non-local correlations between a pair of photons (an EPR-pair) rather than single photons proposed in BB84. Similar ideas can be found in "Quantum Cryptography based on Bell's theorem," by Artur Ekert, Phys. Rev., Lett., 67, (1991) 661. Yet another embodiment of quantum key distribution has been proposed by Biham, Huttner and Mor in "Quantum Cryptographic Networks based on Quantum Memories," Los Alamos preprint archive quant-ph/9604021. Nevertheless, the possibility of improving the efficiency of quantum key distribution is never raised in any of those works.

In summary, previous prior art systems employ similar probabilities for the different non-commuting operators (communication modes). Consequently, at least half of the data are rejected. Besides, the analysis of accepted dam (those that are encoded and decoded using the same operator) is naive. Only the average error rate is computed. A run is accepted whenever the average error rate is small. Some eavesdropping attacks that can be readily detected by a more refined statistical analysis will easily pass such a naive test.

SUMMARY OF THE INVENTION

Briefly discussed, the invention assigns significantly different probabilities for the different non-commuting operators during both transmission and reception to reduce the fraction of discarded data and uses a refined analysis of accepted data to detect eavesdropping. Since the vast bulk of transmissions and receptions are done using a specific operator, the present invention greatly improves the efficiency of quantum key distribution by drastically reducing the mount of rejected data (those that are encoded and decoded with different operators or communication modes). As the number of transmitted signal increases, the efficiency of the scheme asymptotically approaches 100%. This is in sharp contrast with the 50% limit set by prior art methods. The actual efficiency of the present scheme is, of course, limited by both the number of transmitted signals and the intrinsic noise level of the quantum channel.

The invention improves the efficiency of quantum key distribution at no cost to security. An important feature of the invention is refined analysis of accepted data (those that are encoded and decoded with the same operator). The data is divided into separate sets according to the actual operators used in encoding and decoding and the error rate of each set is determined individually. The analysis of the accepted data alone is efficient and sufficient to guarantee the security of the improved scheme due to the invention. In the preferred embodiment of the invention, one accepts a run if, and only if, the error rate in each of the separate sets of the accepted data is small. This type of refined analysis for accepted data leads to improved security even when implemented in the original BB84 scheme.

The invention will be further understood by reference to the following drawings.

DETAILED DESCRIPTION OF THE PREFERRED EMBODIMENT

During the course of this description, like numbers will be used to identify like elements according to the different figures which illustrate the invention.

A. Prior Art Quantum Key Distribution Techniques

If two users, frequently referred to as "Alice" and "Bob", possess shared random secret information (the "key"), they can, with provably security, make their messages in subsequent communication totally unintelligible to an eavesdropper by using the well-known one-time-pad encryption. The safety can be guaranteed, however, only if the key is used once, and then discarded. Therefore, some means of distributing a fresh cryptographic key is needed for provably secure communication.

Since all information, including a cryptographic key, is encoded in measurable physical properties of some object, classical laws of physics leaves open the possibility of passive eavesdropping: A passive wiretapper can simply make copies (clones) of the carder of information and read off from those copies the value of the key. Since the original carrier of information can be resent to the legitimate user without alteration, there is no way for the users to check whether the carrier has been intercepted.

There is a physical law in quantum mechanics known as the "no-cloning theorem", which states that quantum signals cannot be cloned ("A single quantum cannot be cloned", by W. K. Wootters and W. H. Zurek, Nature 299, (1982) 802). Certain pairs of physical properties are complementary in the sense that measuring a property in quantum mechanics necessarily disturb the other. This statement, known as the Heisenberg uncertainty principle, does not refer merely to the limitation of a particular measurement technology: It holds for all possible measurements. Therefore, passive wiretapping is strictly forbidden in any quantum mechanically based cryptographic systems. Any eavesdropping attack will leave a detectable trace in the transmitted signals. The legitimate users can estimate the amount of eavesdropping from the error rate in the transmission of the random key. Should the error rate be large, they discard the transmitted data and re-start the transmission. Otherwise, Alice and Bob can use classical information processing techniques to reduce the amount of information leaked to any eavesdropper to approximately zero, at the expense of shortening the length of their key.

The uncertainty principle can be applied to design a completely secure channel based on the quantum properties of light. The smallest indivisible unit, or quantum, of light is the photon, which can be thought of as a tiny oscillating electromagnetic field. The direction of the oscillation of the electric field is known as the photon's polarization.

Figure 1A:
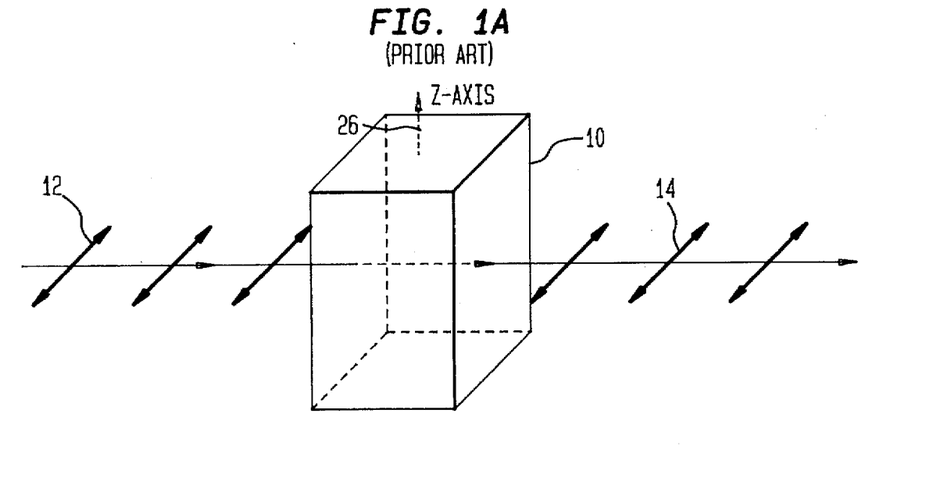
FIG. 1A illustrates how horizontally polarized photons pass straight through a vertically oriented calcite crystal.

A prior art technique used to distinguish between horizontally and vertically polarized photons involves a vertically oriented calcite crystal 10, i.e., the crystal's optic axis 26 is vertical (i.e., along the Z-axis). As shown in FIG. 1A, horizontally polarized photons 12 pass straight through 14, whereas in FIG. 1B vertically polarized photons 16 are deflected to a different path 18. Notice that a photon originally in these two polarizations are deterministically routed into the straight or shifted path, respectively. The law of quantum mechanics tells us that if a photon polarized at some other direction enters the crystal, however, it will have some probability of going into either beam. It will then be repolarized according to which beam it goes into and permanently forget its original polarization. The most random behavior occurs when the photon is polarized halfway between these two directions, that is, at 45 or 135 degrees (See FIG. 1C). Such photons 20 are equally likely to go into either beam 22 and 24, revealing nothing about their original polarization and losing all memory of it after passing through the calcite crystal 10.

Figure 1B:
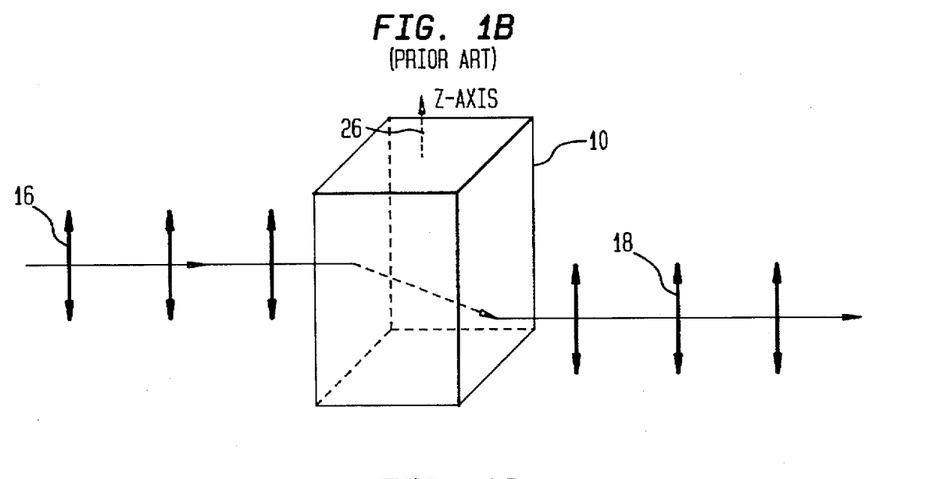
FIG. 1B illustrates the deflection of vertically polarized photons after passing through a vertically oriented calcite crystal.
Figure 1C:
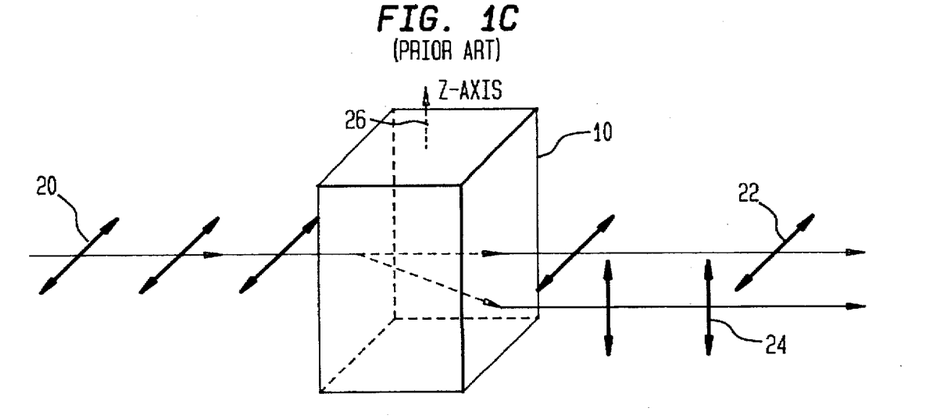
FIG. 1C illustrates repolarization at random in either the vertical or horizontal direction when diagonally polarized photons pass through a vertically oriented calcite crystal.
Figure 2A:
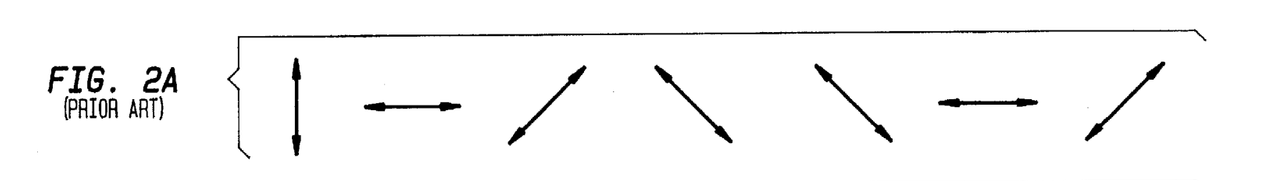
FIG. 2 is a table illustrating of the prior art BB84 quantum key distribution scheme.
Figure 2B:
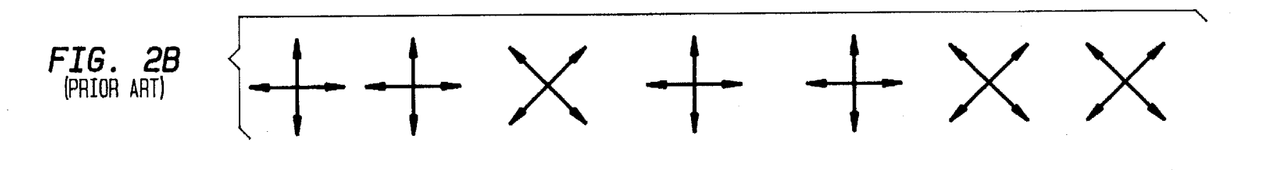
Figure 2C:
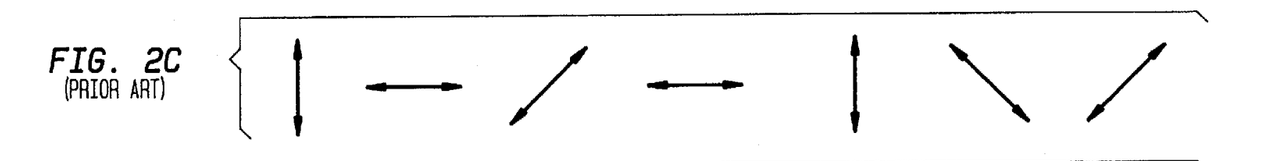
Figure 2D:
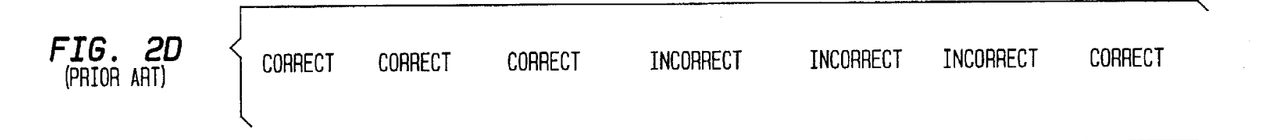
Figure 2E:
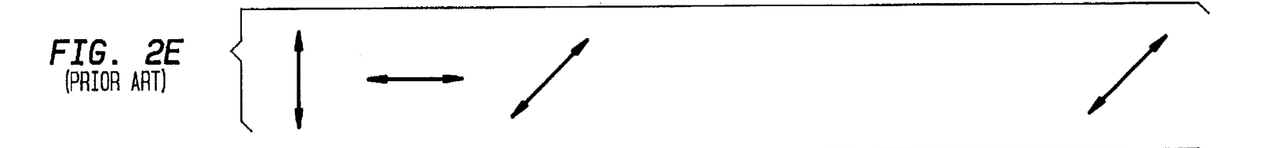
Figure 2F:
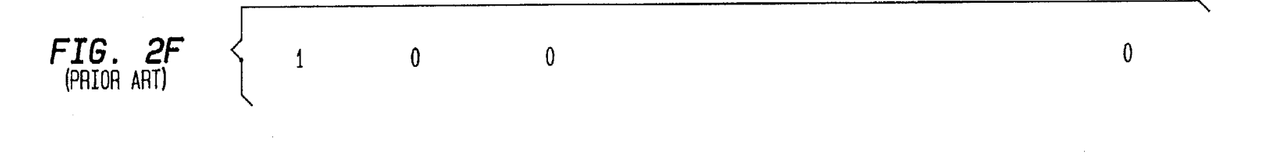

Suppose Bob has been told in advance that a given photon is polarized in one of the two "rectilinear" directions—vertical (90 degrees) 16 or horizontal (0 degrees) 12—without being informed of the specific polarization. Then he can reliably tell which direction by sending the photon into an apparatus consisting of a calcite crystal 10 and two detectors, such as photomultiplier tubes, that can record single photons. The vertically oriented calcite crystal 10 directs the incoming photon to the upper detector if it was horizontally polarized and to the lower detector if it was vertically polarized. Such an apparatus is, however, useless for distinguishing diagonal (45- or 135-degree) photons. In order to distinguish between diagonal photons, one can use a similar apparatus that has been rotated 45 degrees from the original orientation. The rotated apparatus, in turn, is Useless for distinguishing vertical from horizontal photons. According to the uncertainty principle, these limitations apply not just to the particular measurement apparatus described here but to any measuring device that one can possibly build. Rectilinear and diagonal polarizations are complementary properties in the sense that measuring either properties necessarily randomizes the other. In quantum mechanics, these two properties are represented by two non-commuting operators. Horizontally and vertically polarized photons are "eigenstates" of one operator whereas 45-degree and 135-degree polarized photons are "eigenstates" of the other.

B. The Prior Art BB84 Scheme

A prior art scheme for quantum key distribution was proposed by Bennett and Brassard in 1984 ("BB84"). The propose of BB84 is for two users, traditionally called Alice and Bob, to share a secret random key that can subsequently be used to send meaningful secret messages when needs arise. BB84 uses a quantum channel, through which Alice and Bob send polarized photons, in conjunction with a classical public channel, through which they send ordinary messages. An eavesdropper, Eve, is free to try to measure the photons in the quantum channel. However, as noted before, the law of quantum mechanics dictates that she cannot in general do this without disturbing the photons. Furthermore, she learns the entire contents of messages sent through the public channel, but assume for the moment that she could not disturb or alter these messages.

Alice and Bob use the public channel to discuss and compare the signals sent through the quantum channel, testing them for evidence of eavesdropping. If they find none, they can distill from their data a body of information that is certifiably shared, random and secret, regardless of Eve's technical sophistication and the computing power at her disposal. As illustrated in the table of FIG. 2, the prior art BB84 scheme operates as follows:

A) Alice generates and sends Bob a sequence of photons whose polarizations she has chosen at random to be either 0, 45, 90 or 135 degrees. Alice does not tell anyone, including Bob, the polarizations of her photons. (FIG. 2, row a).

B) For each photon received, Bob measures its polarization along either the rectilinear or diagonal basis with equal probability. (FIG. 2, row b).

C) Bob records his chosen basis (FIG. 2, row b.) and his measurement results (FIG. 2, row c).

D) Bob announces publicly, for each photon, which basis (i.e., which type of measurement (FIG. 2, row b) he has chosen but not the measurement result.

E) Alice tells Bob publicly, for each photon, whether he has made his measurement along the correct basis. (FIG. 2, row d).

F) Alice and Bob then discard all cases in which Bob has made the measurement along the wrong basis and keep only the ones that Bob has made the measurement along the correct basis. (FIG. 2, row e).

The two (rectilinear or diagonal) bases of polarizations can be thought of as two distinct and incompatible communication modes. Messages that are encoded and decoded in the same mode can be read off unchanged, whereas those that are encoded and decoded in different mode would be totally unintelligible. On average, half of the photons are transmitted and received in different bases in BB84 and they are, therefores discarded. The chief purpose of the present invention is to reduce the amount of discarded data as described in the preferred embodiment of the invention (Paragraph C). Also, if no one has eavesdropped on the quantum channel and the channel is noiseless, Bob's (unannounced) measurement results for the remaining photons (which are transmitted and received in the same basis) should precisely be the original polarizations chosen by Alice. Since the polarizations of those photons have never been made public, they represent secret information shared between Alice and Bob.

G) Alice and Bob next test for eavesdropping by, for example, publicly comparing and discarding the prepared and measured polarizations of a random subset of their photons. (In practice, only a small portion of the m photons need to be discarded because Alice and Bob can figure out the error rate of the m photons by checking the parities of a small number of random subsets. For this reason, it is not necessary to subtract the contribution of m photons from the efficiency analysis in the paragraph C (Preferred Embodiment of the Invention). More concretely, the procedure may go as follows: Alice and Bob first decide on a maximal tolerable error rate. Errors can occur due to either the intrinsic noise of the channel or eavesdropping attack by a third party, traditionally called Eve. With current technology, the maximal tolerable error rate can be about 3%. Alice and Bob choose randomly m photons from the ones that are transmitted and received in the same basis. For each of the m photons, Bob announces publicly his measurement result. Alice tells Bob publicly whether his result is the same as what she has originally prepared. They then compute the error rate of the m photons. If the error rate is larger than their prescribed tolerable error rate (say 3%), they infer that either the channel is very noisy or substantial eavesdropping has occurred. Therefore, they discard all their data and start over with a fresh batch of photons. If the error rate is smaller than the prescribed tolerable error rate, they adopt the remaining polarizations, which have never been publicly mentioned, as secret bits, interpreting horizontal or 45-degree photons as binary 0's and vertical or 135-degree photons as binary 1's. (FIG. 2, row f).

As discussed previously, the acceptable error rate according to the present state-of-the-art is about 3%. Because of that, the polarization data of the photons are still only partially secure. To eliminate the tiny amount of information Eve may have on their polarization data, Alice and Bob should then apply classical information techniques (such as privacy amplification and error correction) to their impure data to reduce the amount of information leaked to any eavesdropper to approximately zero, at the expense of shortening the length of their key. The shorter, but perfectly secure, key can then be used in the subsequent encryption of meaningful messages. A detailed procedure for privacy amplification and error correction can be found in "Experimental Quantum Cryptography," *Journal of Cryptology* 5, (1992) 3, by C. H. Bennett et al.

The number m must be large enough (for example, 400) for a fairly accurate estimate of the error rate of the transmission. The above comparison test acts as a "quality control". If substantial eavesdropping has occurred, significant error rates will almost surely been found in the comparison of the polarization data of a random subset consisting of m photons. (See the next paragraph for a discussion.) On the other hand, if a run passes the comparison test, then Alice and Bob can almost surely set a limit on the amount of information that has leaked to an eavesdropper. Since the polarization data of the m test photons have already been publicly announced, Alice and Bob must discard those data. By sacrificing only m photons, Alice and Bob can be sure of the security of the polarization data of remaining photons.

Figure 3A:
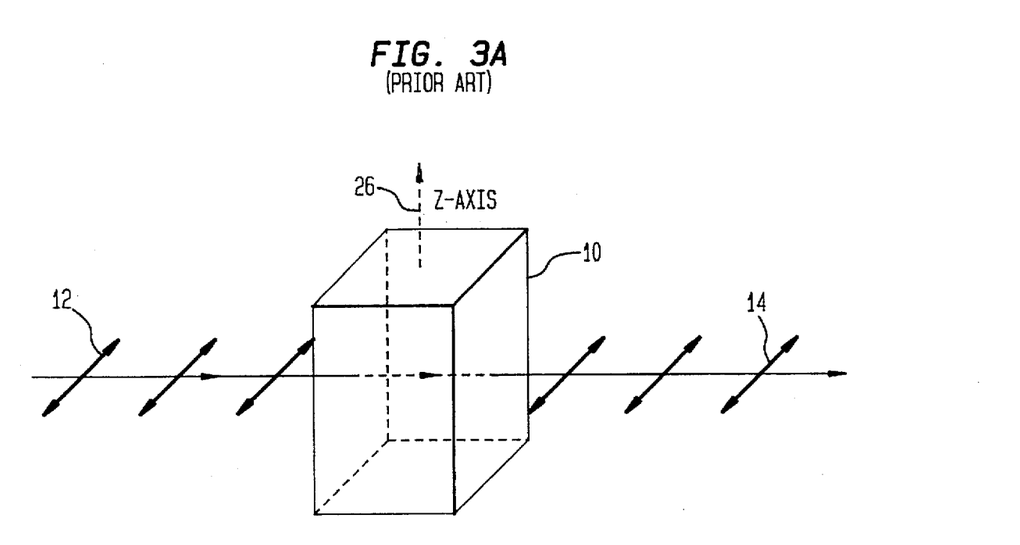
FIG. 3A illustrates the results of a lucky eavesdropper, Eve, who happens to choose the correct basis and is able to read off the polarization accurately without disturbing the photon polarization, which is received by Bob.

Consider an eavesdropping attack against the BB84 technique. Because of the uncertainty principle, an eavesdropper, Eve, cannot measure both rectilinear and diagonal polarizations of the same photon. A priori Eve does not know which basis to use for each photon. One possible strategy is for Eve to choose randomly either the rectilinear or diagonal basis to measure the polarization of the photon. If she is lucky enough to have chosen the basis along which the photon is originally polarized, she can read of its polarization without disturbing it. She can then resend the result of her measurement without being detected by Bob. For example, in FIG. 3A, if Alice is sending a horizontally polarized photon 12 and Eve is measuring using a vertically oriented 26 calcite crystal 10, then Eve can read off the polarization of the photon correctly 14 without disturbing it.

Figure 3B:
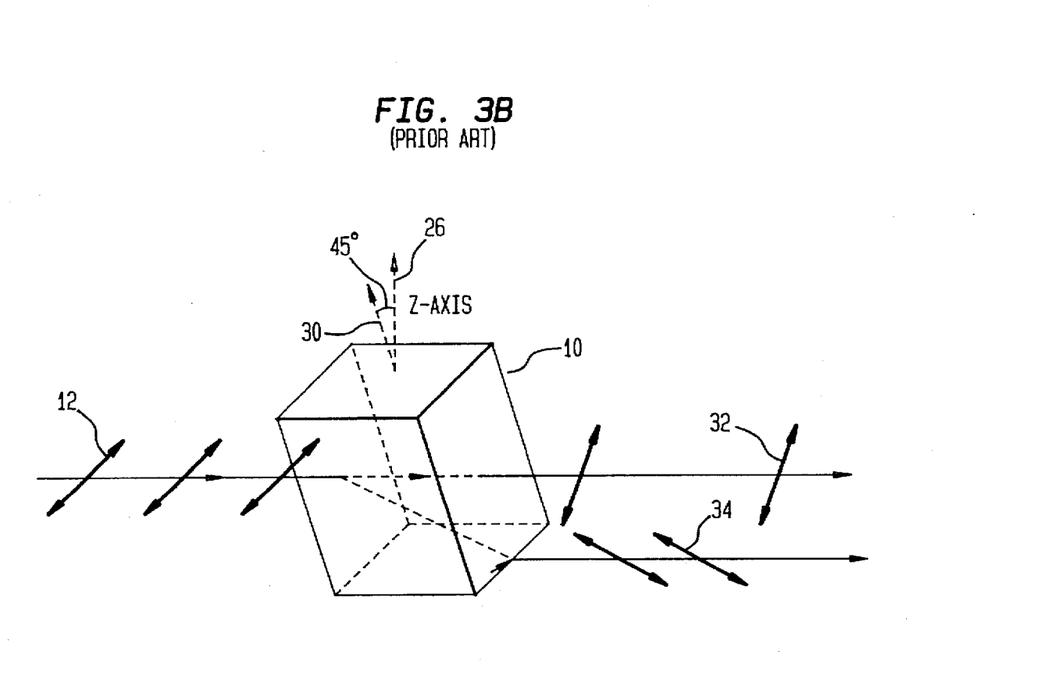
FIG. 3B illustrates the results of an unlucky eavesdropper, Eve, who happens to choose the wrong basis, thereby disturbing the photon polarization and leaving a trace in the signal which is detectable by Bob.

If, for a particular photon, Eve has chosen to measure its polarization in a basis that is different from the one that it is originally polarized along, then the state of the photon will be disturbed. For example, in FIG. 3B, Alice is sending a horizontally polarized photon 12 and Eve is measuring along the diagonal basis by rotating the calcite crystal 10 so as to position its optic axis 30 45° relative to the z-axis 26. Eve will change the polarization of the photon 32 and 34 she has measured. Even if she resends Bob a photon consistent with the result of her measurement, she will have irretrievably randomized the polarization originally sent by Alice. The net effect of such an intercept/resend strategy along the two bases with equal probability is to cause errors in one quarter of the bits in Bob's data that have been subjected to eavesdropping.

Figure 4A:
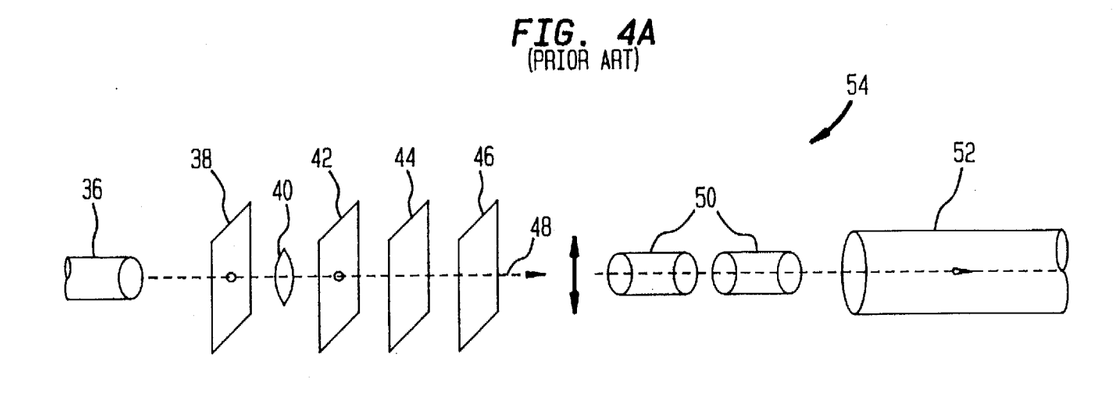
FIG. 4A illustrates schematically the sender's part of the system that can be used to implement the preferred embodiment of the invention.
Figure 4B:
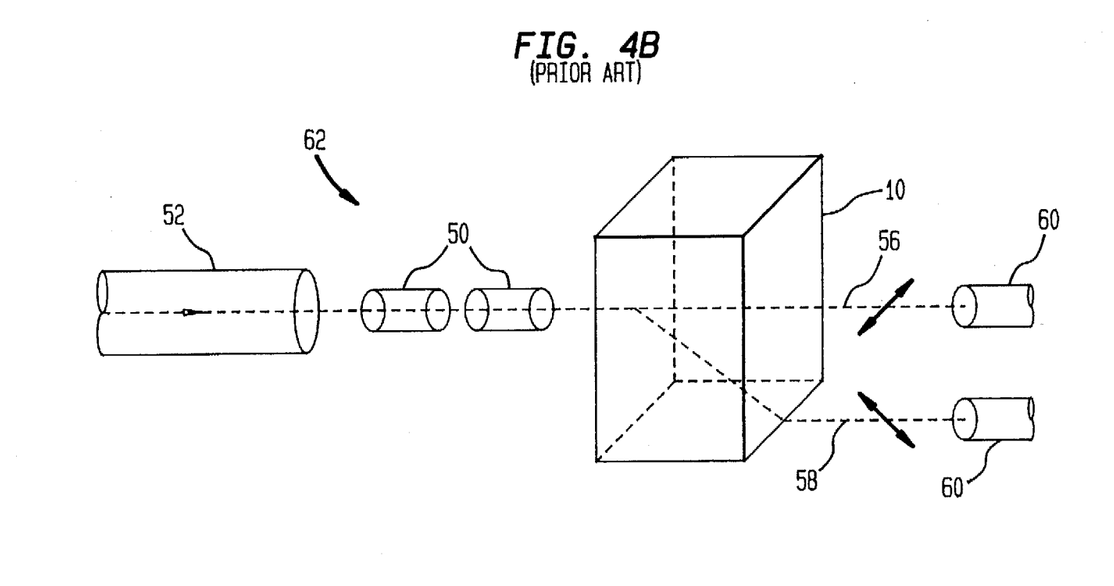
FIG. 4B illustrates schematically the receiver's part of the system that can be used to implement the preferred embodiment of the invention.
Figure 5A:
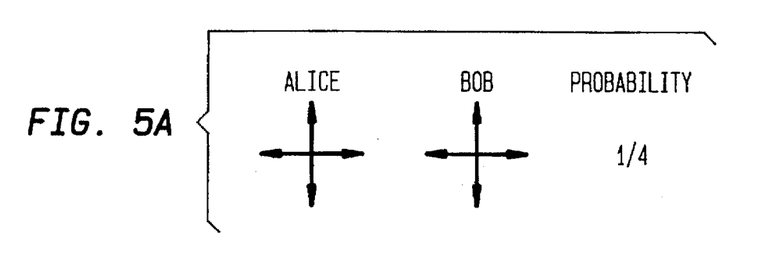
FIG. 5 is a table illustrating the efficiency of the prior art BB84 technique which rejects 50% of the data on average.
Figure 5B:
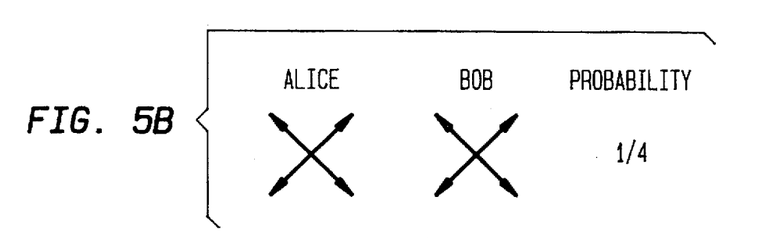
Figure 5C:
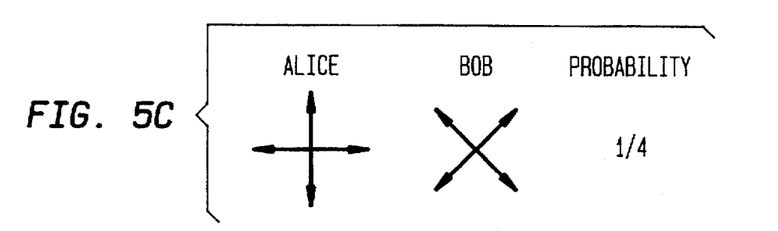
Figure 5D:
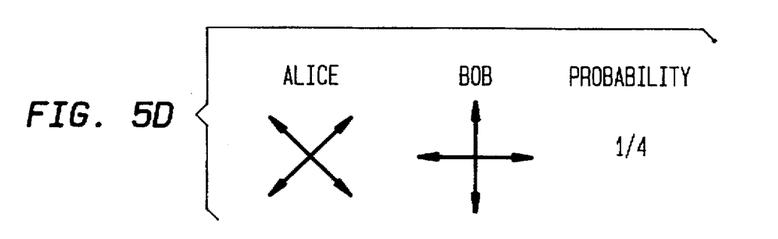

FIGS. 4A and 4B depict a quantum cryptographic apparatus that can be used with the preferred embodiment of the invention. The leftmost part of Alice's sending apparatus 54 consists of a green light-emitting diode 36, a pinhole 38, a lens 40, an aperture 42, a color filter 44, and a polarizer 46 that provide a collimated beam of horizontally polarized light 48. Electro-optic devices known as Pockels cells 50 are then used to change the original polarization of the photon to any of four standard polarization states under Alice's control. The photon is then sent to a quantum channel 52.

At the other end of the quantum channel 52, Bob's receiving apparatus 62 contains similar Pockels cells 50, which allow him to choose the type of polarization he will measure. After the beam passes through Bob's Pockels cells 50, it is split by a calcite prism 10 into two perpendicularly polarized beams 56 and 58 which are directed into two photomultiplier tubes 60 for the purpose of detecting individual photons.

The prototype depicted in FIGS. 4A and 4B uses faint light pulses instead of individual photons as required in BB84. This replacement gives rise to a new kind of eavesdropping attack—the beamsplitter attack. These details are, however, irrelevant for our discussion. (See "Experimental Quantum Cryptography," *Journal of Cryptology* 5, (1992) 3, by C. H. Bennett et al. for details).

C. The Preferred Embodiment of the Invention

To understand the present invention, it is useful to examine the efficiency of BB84. In FIGS. 5A–5D, the data is divided into four cases according to the bases chosen by Alice and Bob. Since Alice and Bob choose the two bases [rectilinear (+) and diagonal (x)] with equal probability, each of the four cases occurs with a probability ¼. Notice that the data in cases 5C and 5D must be discarded because Bob has made the wrong measurement. Therefore, 50% of the data are rejected for that reason. The present invention improves the efficiency of quantum key distribution by drastically reducing the amount of rejected data. BB84 is used as the preferred embodiment and it will be shown, rather remarkably, that one can asymptotically double the efficiency of the original BB84 scheme by assigning unequal probabilities to the two bases. It will also be shown in paragraph D (Analysis of Accepted Data) below that the ability of detecting eavesdropping is not compromised by the present invention.

The present invention, which significantly reduces the fraction of discarded data in BB84, is described as follows:

A) For each photon, Alice chooses the recti linear and diagonal bases with unequal probabilities $\epsilon$ and $1\epsilon$ where $\epsilon \leq \frac{1}{2}$. She then chooses the two polarizations of a basis with equal probability. For example, $\epsilon=0.1$. The value of $\epsilon$ is public and is, therefore, known to the eavesdropper. However, at this stage Alice does not tell anyone, including Bob, the actual polarization nor the basis that she has chosen for each photon.

B) Bob also chooses to measure along the rectilinear and diagonal bases with unequal probabilities $\epsilon'$ and $1-\epsilon'$. In the preferred embodiment of the invention, $\epsilon'$ is chosen to be equal to $\epsilon$. However, the invention applies to a general $\epsilon'$.

Steps C), D) and E) are the same as in BB84. (See FIG. 2). In other words, Bob records, for each photon, the basis used and the measurement result obtained. He announces publicly the basis but not the measurement result. Alice then tells him whether he has performed the correct measurement (A correct measurement is one in which Alice and Bob use the same basis.) for each photon.

F) Alice and Bob discard all data in which Bob has performed the wrong measurement. (i.e, the ones in which Alice and Bob use different bases.) In the table of FIGS. 6A–6D, one divides up the data into four cases according to the bases [rectilinear (+) or diagonal (x)] used by Alice and Bob. Notice that discarded data (those in which Alice and Bob use different bases) correspond to cases (c) and (d) in FIGS. 6C and 6D. Owing to the unequal probabilities assigned to the two bases, the fraction of rejected data is, on average, only $2\epsilon(1-\epsilon)$. For example, if $\epsilon=0.1$, the fraction of discarded data is only 0.18 which is less than half of 0.5, the fraction of discarded data in BB84. Of course, one can reduce this fraction further by decreasing $\epsilon$. As will be discussed in the subsection "constraint on $\epsilon$", $\epsilon \leq \sqrt{(m/N)}$ where N is the number of transmitted photons and m is defined in step G) immediately below.

Figure 6A:
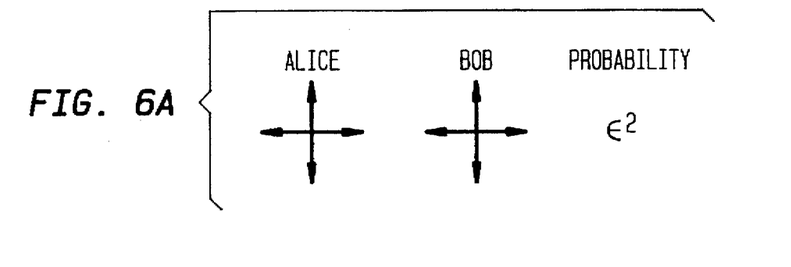
FIG. 6 is a table illustrating the efficiency of the invention according to the preferred embodiment thereof, with the fraction of rejected data (those belonging to cases (c) and (d)) being reduced to $2\epsilon (1-\epsilon)$.
Figure 6B:
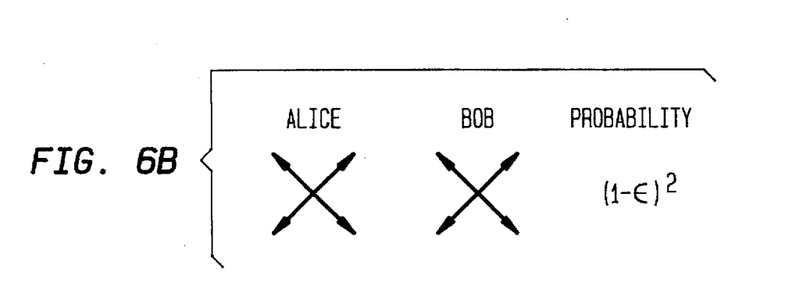
Figure 6C:
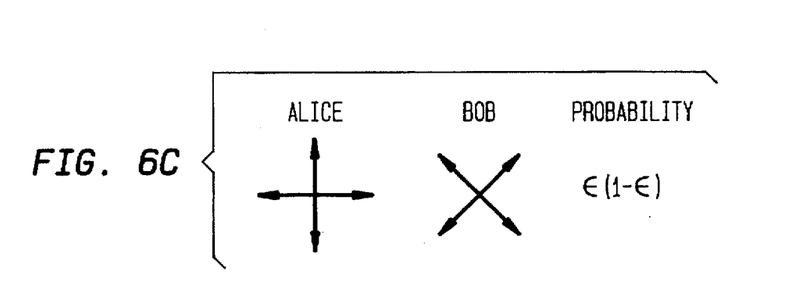
Figure 6D:
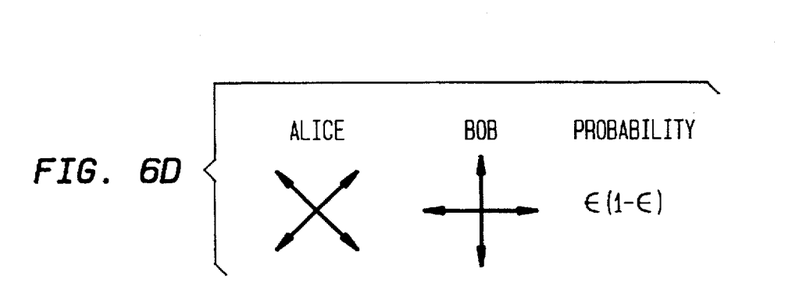

G) Alice and Bob randomly select m photons from case (a) in the table of FIG. 6A to publicly compare and discard their polarization data. This would give an estimate of the error rate for case (a). Similarly, they randomly select m photons from case (b) in FIG. 6B to publicly compare and discard their polarization data. This would give an estimate of the error rate for case (b). The number m must be sufficiently large so that the m test photons give Alice and Bob a fairly accurate estimate of the error rate. For example, m=400. Alice and Bob must decide on the maximal tolerable error rate. With current technology, it can, for example, be 3%. If at least one of the two error rates are larger than say 3%, they infer that substantial eavesdropping might have occurred. Therefore, Alice and Bob discard all the data and start over with a fresh batch of photons. It is only when error rates for both cases (a) and (b) in FIGS. 6A and 6B are small that they conclude that an eavesdropper, Eve, can have only very limited amount of information on the polarization data. Therefore, they adopt the remaining polarizations, which have never been publicly mentioned, as secret bits, interpreting horizontal or 45-degree photons as binary 0's and vertical or 135-degree photons as binary 1's. To eliminate the tiny amount of information that Eve may still hold, they use classical information processing techniques such as privacy amplification and error correction to their impure key to distill a shorter and perfectly secure key, which can then be used for subsequent encryption of meaningful messages. Details of privacy amplification and error correction can be found in "Experimental Quantum Cryptography," *Journal of Cryptology* 5, (1992) 3, by C. H. Bennett et al.

In practice, only a small portion of the photons needs to be discarded because Alice and Bob can figure out the error rate of the m photons by checking the parities of a small number of random subsets. For this reason, the contribution of m photons to the efficiency is not subtracted in the above discussion following step F).

D. Analysis of Accepted Data

It is useful to note that an important element of the preferred embodiment of the invention is a more refined analysis of the accepted data. The idea is to divide the accepted data into different sets according to the actual basis used and perform separate error estimation to each set. This is to be contrasted with the original BB84 scheme in which only the average error rate of the accepted data is computed. When implemented in BB84, this idea of refined accepted data analysis would give enhanced security. Moreover, it can also be used to guarantee the security of the improved scheme presented in the preferred embodiment of the invention.

Figure 7A:
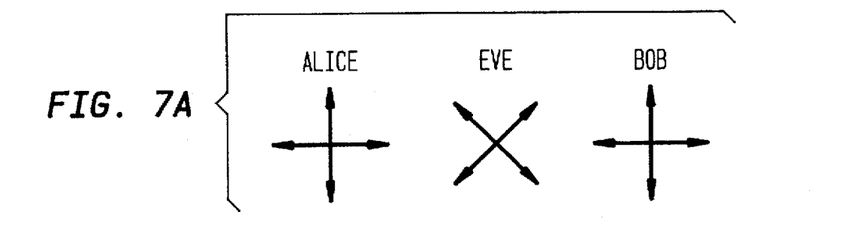
FIG. 7 is a table illustrating an example of an eavesdropping attack using the intercept/resend method against the present invention.
Figure 7B:
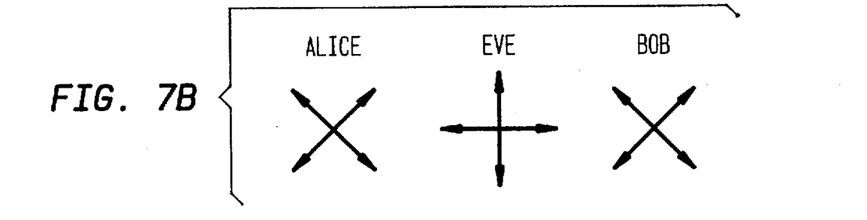

To understand why such a refined analysis of accepted data is useful, consider a simple intercept/resend eavesdropping strategy adopted by Eve. In this scenario, for each photon, Eve measures its polarization along the rectilinear and diagonal bases with probabilities $p_1$ and $p_2$ respectively. She records the result of her measurement and resends the photon to Bob. With a probability $1-p_1-p_2$, Eve does nothing to the photon. Suppose that Alice and Bob have decided that the acceptable error rate for each basis is only 3%. Will Alice and Bob discover Eve's eavesdropping attack? To make this determination, first calculate the error rates for cases (a) and (b) as illustrated in the table of FIGS. 6A and 6B, respectively. In case (a), Alice and Bob both use the rectilinear basis and the error arises only when Eve is eavesdropping along the diagonal basis. (See the table in FIG. 7A). Since Eve is doing so with a probability $p_2$ and her measurement randomizes the polarization of the incoming photons, the expected error rate of case (a) should be $p_2/2$. By a similar argument, the expected error rate of case (b) (See the table in FIG. 7B) should be $p_1/2$. Therefore, for Eve to avoid being detected by the two users who compute the error rates of cases (a) and (b) separately according to the invention, she has to choose $p_1$ and $p_2$ to satisfy the two conditions $p_1 \leq 6\%$ and $p_2 \leq 6\%$.

How much information can Eve gain out of such an eavesdropping attack? Since Eve has performed the correct measurement only with a probability 6%, the amount of information she has on the raw key (i.e., before privacy amplification and error correction) is only 6%.

Notice that, in BB84, only the average error rate is computed. In that case, an acceptable average error rate of 3% implies a single constraint $(p_1+p_2) \leq 12\%$. This is less stringent than the two constraints $p_1 \leq 6\%$ and $p_2 \leq 6\%$ set by the invention. For instance, the case when $p_1=0$ and $p_2=9\%$ violates the second constraint and will be detected by the invention whereas it passes the naive test in BB84. Therefore, the idea of dividing up accepted data into different sets according to the actual basis used and performing separate error estimation to each set will lead to enhanced security even for BB84.

When the two communication modes (polarization bases) are chosen with significantly different probabilities, as in the preferred embodiment of the invention, a refined analysis of the accepted data is much more powerful than a naive analysis in detecting eavesdropping. To see this, consider the original naive data analysis in which one simply lumps all the data together and computes a single error rate for the whole transmission. For the simple intercept/resend strategy described above, the average error rate is $[p_2\epsilon^2+p_1(1-\epsilon)^2]/2$. Suppose the maximal tolerable error rate is again set to be 3%. With $\epsilon=0.1$, Eve may choose $p_1=0$ and $p_2=1$. In other words, she always measures the polarization of the photon along the diagonal basis. The average error rate is only $[p_2\epsilon^2+p_1(1-\epsilon)^2]/2=1\%<3\%$. Such a strategy will defeat a naive test. Yet Alice will gain a substantial amount of information about Bob's measurement results as she is measuring along the basis in which the vast bulk of the transmissions are made.

If, however, one had followed the teachings of the present invention to estimate the error rates of cases (a) and (b) separately, one would have found the error rate for case (a) to be 50% which is far higher than the acceptable 3% error rate. The whole run would, therefore, have been rejected in the correct prescription of the invention. In conclusion, an indispensable element of the preferred embodiment of the invention is to further classify the acceptable data (those that are transmitted and received in the same basis) into subcategories according to the actual basis used and estimate the error rate for each subcategory individually. It is only when the error rates for all subcategories are small that one should accept the run. This gives the invention extra power in detecting eavesdropping beyond the naive scheme in which all the acceptable data are lumped together to determine a single error rate.

Of course, Eve may use other eavesdropping strategies. For instance, she may choose to measure the polarization of the photon in a basis midway between the rectilinear and diagonal bases with a probability $p_m$. A simple exercise in quantum physics shows that this strategy introduces an error rate of $2p_m\cos^2 22.5°\sin^2 22.5°=p_m/4$ to both cases (a) and (b). The constraint that both error rates be no larger than 3% implies that Eve would better choose $p_m \leq 12\%$. This is true for both BB84 and the improved scheme according to the invention. More generally, one can repeat the analysis made in "Experimental Quantum Cryptography," C. H. Bennett et al., Journal of Cryptology 5, (1992) 3 to show that any realistic eavesdropping attach would introduce some characteristic error rates for cases (a) and (b) respectively and those error rates are independent of the probabilities assigned by Alice and Bob to the two bases (or equivalently, the value of $\epsilon$). Therefore, the foregoing analysis shows that the improved scheme due to the invention presented here must be as secure as BB84 against such attacks.

It is important to note that, in some cases, the refined analysis of accepted data according to the current invention gives one more power in detecting eavesdroppers than the refined analysis of discarded data proposed in PCT WO94/ 08409 and "Bell's Inequality and Rejected-data Protocols for Quantum Cryptography," Journal of Modern Optics 40, (1993) 1443. For instance, any refined analysis of rejected data is totally useless for detecting eavesdropping in the preferred embodiment of the invention if the eavesdropper is measuring the polarizations of photons along the rectilinear and diagonal bases. The reason is the following: There are only two bases in the preferred embodiment of the invention.

Since each photon in rejected data involves two bases, each basis (rectilinear or diagonal) must be used by either Alice or Bob. An eavesdropper using either basis is simply measuring along a basis that is used by either Alice or Bob. Clearly, no new error is introduced by such an innocent measurement at all. Therefore, no anomalous error rate will show up in rejected data. This is in sharp contrast to the significant increase in error rates for accepted data discussed above.

E. Constraint on $\epsilon$

It is useful to recall that the two polarization bases (rectilinear and diagonal) are chosen by each of Alice and Bob with probabilities $\epsilon$ and $1-\epsilon$. There is a constraint on e. It must be large enough so that one can estimate the error rate for case (a) reliably. Suppose the typical error rate is in the region 1–5% and one is transmitting 10,000 photons. In order to obtain a fairly accurate estimate of the error rate, it would be desirable to compare and discard the polarization data of say 400 photons that are transmitted and received using the rectilinear bases (i.e., in case (a) of FIG. 6). Considering the expected number of photons belonging to case (a), one obtains $10,000\epsilon^2 \geq 400$, i.e., $\epsilon \geq 0.2$. For $\epsilon=0.2$, the fraction of discarded data, $2\epsilon(1-\epsilon)$, is 32% as compared to 50% in the prior art BB84. In other words, the fraction of accepted data (for which the quantum mode of transmission matches that of reception) is 68%. If one is transmitting 40,000 photons instead, it still suffices to test only 400 photons that are in case (a). So, one has $40,000\epsilon^2 \geq 400$ and may use any $\epsilon \geq 0.1$ For $\epsilon=0.1$, the fraction of rejected data is reduced to 18%. In that case, the fraction of accepted data (for which the quantum mode of transmission matches that of reception) is 82%. If N is 100 million and one still tests only 400 photons, $\epsilon$ can be as small as 0.2%. That is to say that the fraction of discarded data $2\epsilon(1-\epsilon)$ can be as small as 0.4%. This is a hundredfold reduction in the fraction of discarded data as compared to the 50% fraction in BB84. More generally, the constraint on $\epsilon$ is that $\epsilon \geq \sqrt{(m/N)}$ where N is the number of photons transmitted and m is the number of photons belonging to case (a) in FIG. 6A whose polarization data are compared and discarded for the testing of eavesdropping. Note that, for a fixed m, as N becomes larger and larger, $\epsilon$ can be made smaller and smaller. It asymptotically approaches zero, but never quite reach it. The fraction of discarded data, as given by $2\epsilon(1-\epsilon)$ is also arbitrarily small in this limit. Notice that, so long as $\epsilon \geq \sqrt{(m/N)}$, the security of the protocol is essentially independent of the value of $\epsilon$. In other words, the invention gains efficiency without sacrificing security.

It is also to be understood that the invention is not restrictive to the case of a fixed m. For example, one may imagine a cryptographic apparatus which allows the users to input the values of N and $\epsilon$. Moreover, one can imagine that Alice and Bob publicly announce and change the value of $\epsilon$ during an operation. For instance, Alice and Bob can use $\epsilon=0.1$ for the first half of the signals and 0.9 for the second half of the signals. That is to say that while they predominately use the diagonal basis for the first half of the transmission, the rectilinear basis is predominately used for the second half of the transmission. They can separately analyze the data of two halves of the transmission.

The invention just described has distinctive advantages over prior art devices. It can drastically decrease the amount of rejected data from 50% to $2\epsilon(1-\epsilon)$. For a typical $\epsilon=0.1$, the latter is 18% and the fraction of accepted data is 82%. As discussed in the last paragraph, there is no priori limit to the extent of this reduction. The only constraint is $\epsilon \geq \sqrt{(m/N)}$ (where N is the number of photons transmitted and m is the number of photons belonging to case (a) in FIG. 6A whose polarization data are compared and discarded for the testing of eavesdropping). The case when m is 400 and N is 100 million, for example, gives a hundredfold reduction in the fraction of discarded data. Besides, as illustrated by the example N=10,000 in the last paragraph, the invention is useful even for rather modest number of transmitted photons. In that case, the fraction of rejected data is reduced from 50% in the prior art to 32%. That is to say, for 68% of the signals, the quantum mode of transmission matches the quantum mode of reception. Moreover, the invention does not compromise security as compared to the prior art, BB84. In some cases, for example, when the eavesdropper is measuring the polarization of the photons along a single basis, it even gives added security. Furthermore, the invention is extremely simple to implement: The only real big change is for the two users, Alice and Bob, to select the two bases with unequal probabilities $\epsilon$ and $1-\epsilon$. All Alice and Bob need is some biased coins which have a probability $\epsilon$ of being 'up' and $1-\epsilon$ of being 'down'. They can then decide on which basis to use, for each photon, by using the outcome of flipping one of such biased coins. More realistically, they can use a true random number generator to do the same job. As discussed above, Alice and Bob also have to divide up their acceptable data into different sets according to the actual basis used and perform separate statistical analysis to them, but this should be easy to implement as well.

F. Other Embodiments

A key idea of the invention is to use significantly different probabilities for the different communication modes (or non-commuting operators). This strategy can be adopted by both users, the sender and receiver, to reduce the fraction of rejected data because the vast bulk of the communication can be made with common operators.

In the preferred embodiment of the invention, both Alice and Bob choose the rectilinear and diagonal bases (quantum communication modes) with probabilities $\epsilon$ and $1-\epsilon$. However, as remarked in step B) an alternative embodiment is to allow Alice and Bob to use different biases in choosing the two bases. For instance, Alice chooses the rectilinear and diagonal bases with probabilities a and $1-a$ while Bob chooses the rectilinear and diagonal bases with probabilities b and $1-b$ where b can be different from a. Here, just like $\epsilon$, a and b are made public and are both supposed to be small.

Another embodiment of the invention is to choose the various polarizations within the same basis (say the horizontal and vertical polarizations) with different probabilities. So long as the probability of using one basis is significantly larger than the other, the scheme can still be efficient. For instance, Alice chooses the horizontal, vertical, 45-degree and 135-degree polarizations with probabilities $p_1$, $p_2$, $p_3$ and $p_4$ ($p_1+p_2+p_3+p_4=1$) where $p_3+p_4 \leq 0.3$ or $\geq 0.7$. A special case is one in which Alice chooses the horizontal, 45-degree and 135-degree polarizations with probabilities 0.1, 0.45 and 0.45 and Bob decodes along the rectilinear and diagonal bases with probabilities 0.2 and 0.8 respectively.

The non-commuting operators are not restricted to the polarization of photons. For example, another embodiment of the invention is to use the path taken by a photon rather than its polarization to encode the information. A single-photon interference system is discussed in a manuscript "Quantum Cryptography Using Any Two Non-orthogonal States", C. H. Bennett, Phys. Rev. Lett. 68, (1992) 3121. This is an embodiment in which single photon signals are analyzed through interferometry.

Yet, another embodiment of the invention is to use non-local correlations between photon pairs (the so-called EPR pairs) instead of single photons. See, for example, U.S. Pat. No. 5,243,649.

Furthermore, the invention can also be applied to the scheme proposed by Biham, Huttner and Mor in "Quantum Cryptographic Network Based on Quantum Memories," Los Alamos preprint archive quant-ph/9604021, asymptotically doubling its efficiency. The idea is for the two users, Alice and Bob, to store up secretly prepared quantum memories that are "eigenstates" of non-commuting operators in a cryptographic key distribution center. The center then performs a measurement on the combined quantum state of a pair of particles, one from each user. Afterwards, the center sends the results of its measurements to the two users. Biham, Huttner and Mor have shown that this scheme is conceptually equivalent to BB84.

There may also be complications and modifications in the ultimate implementation. As noted earlier, faint light pulses instead of ideal single photon pulses may be employed in the implementation of BB84 or the improved scheme according to the present invention. Moreover, the - invention can also be combined with a discarded data protocol such as discussed in PCT Application No. WO94/08409.

While the invention has been described with reference to the preferred and alternative embodiments thereof, it will be appreciated that various modifications can be made to the parts and methods that comprise the invention without departing from the spirit and scope thereof.

We claim:

1. A cryptographic communication method employing at least two quantum communication modes comprising the steps of:
   producing a stream of quantum signals from a signal source;
   controlling and measuring the quantum modes of transmission of signals produced from said signal source to produce a transmitted stream of signals;
   measuring the quantum modes of reception of signals from said transmitted stream of signals such that the quantum mode of transmission matches the quantum mode of reception for at least 68 percent of the transmitted signals,
   wherein the amount of discarded data is substantially reduced.

2. The method of claim 1 in which the quantum mode of transmission matches the mode of reception at least 82 percent of the transmitted signals.

3. The method according to claim 1 in which the transmitter uses two quantum communication modes with probabilities a and 1−a respectively and the receiver uses two quantum communication modes with probabilities b and 1−b respectively,
   wherein a, b $\geq 0.8$.

4. The method of claim 1 in which the signals are photons and in which quantum modes of communication are polarization bases of photons.

5. The method according to claim 4 in which the transmitter encodes each photon signal in one of the following four polarizations: horizontal, vertical, 45-degree and 135-degree and the receiver decodes each photon signal along either the rectilinear or diagonal bases.

6. The method according to claim 5 in which the four polarizations: horizontal, vertical, 45-degree and 135-degree are used by the transmitter with probabilities $p_1$, $p_2$, $p_3$, and $p_4$ ($p_1+p_2+p_3+p_4=1$) where $p_3+p_4 \leq 0.2$ or $\geq 0.8$ and the receiver decodes each photon signal along the rectilinear and diagonal bases with probabilities $1-p_d$ and $p_d$ where $p_d \leq 0.2$ or $\geq 0.8$.

7. The method according to claim 6 in which $p_1=p_2$ and $p_3=p_4$.

8. The method according to claim 7 in which $p_d=2p_3$.

9. The method according to claim 4 in which the transmitter encodes each photon signal in one of the six polarizations: horizontal, vertical, 45-degree, 135-degree, right-circular and left-circular.

10. The method according to claim 1 in which pairs of non-local correlated photons are used as signals.

11. The method according to claim 1 in which photon signals are measured through interferometry.

12. The method according to claim 1 in which quantum memories are used as signals.

13. A cryptographic communication method employing at least two quantum communication modes comprising the steps of:
    producing a stream of quantum signals from a signal source;
    controlling and measuring the quantum modes of transmission of signals produced from said signal source to produce a transmitted stream of signals;
    measuring the quantum modes of reception of signals from said transmitted stream of signals such that the data that are transmitted and received in the same quantum communication mode are divided into more than one set according to the actual communication mode used;
    wherein an estimation of the error rate is applied to individual sets in order to determine the extent of eavesdropping.

14. The method according to claim 13 in which, for each said set, a fixed number, m, of quantum signals are randomly sampled to estimate the error rate of each set.

15. The method according to claim 14 in which a stream of N photons is transmitted, each in the rectilinear and diagonal bases with probabilities $\epsilon$ and $1-\epsilon$, and received by a receiver which measures the polarizations along the rectilinear and diagonal bases with probabilities $\epsilon'$ and $1-\epsilon'$ wherein $$N\epsilon\epsilon' \geq m.$$

16. The method according to claim 15 wherein $\epsilon=\epsilon'$.

17. The method according to claim 13 in which the transmitted stream of signals are photons and in which the polarization bases of photons are used as the quantum modes of communication.

18. The method according to claim 13 in which pairs of non-local correlated photons are used as signals.

19. The method according to claim 13 in which single photon signals are analyzed through interferometry.

20. The method according to claim 13 in which quantum memories are used as signals.

21. A cryptographic communication system employing at least two quantum communication modes comprising:
    a source for producing a stream of quantum signals;
    transmitter means for controlling and measuring the quantum modes of transmission of signals produced from said signal source;
    receiver means for measuring the quantum modes of reception of signals from said transmitted stream of signals, wherein the quantum mode of transmission matches the quantum mode of reception for at least 68 percent of said transmitted stream of signals thereby reducing the amount of data discarded.

22. The system of claim 21 wherein the quantum mode of transmission matches the quantum mode of reception for at least 82 percent of said transmitted stream of signals.

23. A cryptographic communication system employing at least two quantum communication modes comprising:

a source for producing a stream of quantum signals;

transmitter means for controlling and measuring the quantum modes of transmission of signals produced from said signal source;

receiver means for measuring the quantum modes of reception of signals from said transmitted stream of signals, wherein the data that are transmitted and received in the same quantum communication mode are divided into at least two sets according to the actual communication mode used and an estimation of error is applied to at least two of said individual sets in order to determine the extent of eavesdropping.

24. A cryptographic system employing at least one quantum channel comprising:

a proton source for producing a proton stream;

a transmitter means for selectively controlling the polarity of the protons transmitted from said proton stream, wherein there are at least N protons in said stream and there is a probability $\epsilon$ that they are in a given polarity;

receiver means for receiving and measuring the polarity of protons sent by said transmitter means and sampling m of them and there is a probability $\epsilon$ that they are in the same polarity, wherein the mode of measurement of the m photons are compared with the mode of transmission and wherein $$\epsilon \geq \sqrt{\frac{m}{N}}$$

and $$\epsilon \leq 0.2.$$

25. The system of claim 24 where $\epsilon \leq 0.1$.

* * * * *